Figure 1:
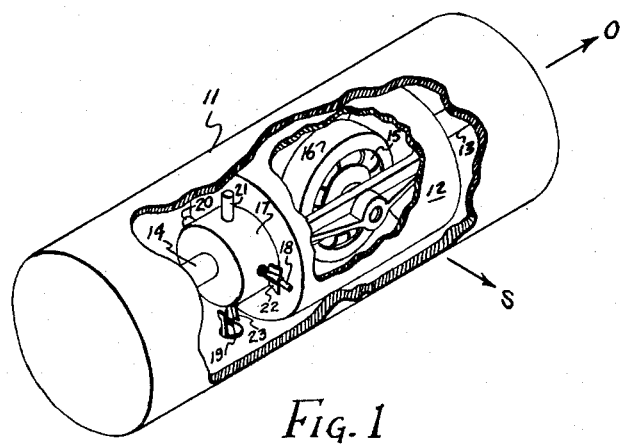

Dec. 7, 1965    N. C. ZATSKY ETAL    3,221,565
ADJUSTABLE THREADLESS POSITIONING DEVICES
Filed April 17, 1962

INVENTORS
NORMAN C. ZATSKY
BY ALAN E. WILLIS

C. F. Spencer
ATTORNEY

United States Patent Office 3,221,565
Patented Dec. 7, 1965

3,221,565
ADJUSTABLE THREADLESS POSITIONING
DEVICES
Norman C. Zatsky, Huntington, N.Y., and Alan E. Willis, Stamford, Conn., assignors, by mesne assignments, to Dynamics Corporation of America, New York, N.Y., a corporation of New York
Filed Apr. 17, 1962, Ser. No. 188,028
12 Claims. (Cl. 74—5.4)

This invention relates to precision threadless adjusting devices and in particular to a threadless adjustable balance weight for balancing precision instruments or scales.

In certain gyroscopes and other delicate instruments, a need exists for a simple and reliable means for mechanically balancing the instrument about a given axis after it has been manufactured. In certain instances, it is desirable to mechanically balance the instrument after it has been hermetically sealed.

The use of the threaded split nut as the balancing weight which is positioned along a threaded rod attached to the instrument to be balanced has been widely used for balancing mechanical instruments and scales. In balancing very small and delicate gyroscopes, it has been found to be impractical to machine miniature threaded pins and miniature balance weights in production and to maintain a satisfactory fit of the threaded balance weight on the threaded pin. Due to the extreme fineness of the threads, they become easily worn with adjustment causing small bits of metal to fall off resulting in contamination of the instrument. It has not been possible to machine threads of sufficiently high pitch on the threaded members to assure a satisfactory fine balance adjustment.

The present invention achieves a solution to the above problem by providing an extremely fine and precise balancing adjustment without the use of threaded parts. The shaft of the balance pin and the bore of the split balance weight are made smooth and the bore of the balance weight is tightly pressed over the shaft of the balance pin. To translate or position the balance weight along the balance pin to achieve a precise balance, the split balance weight is provided with radially projecting plate members extending longitudinally along the balance weight. These plate members are provided with a smooth flat surface and the plane of this surface is slightly inclined relative to the axis of the bore of the balancing weight. A balance key supported by the case or outer shell of the instrument is provided with a rotatable arm whose tip is adapted to engage the inclined surface of the projecting plate member. The tip of the rotatable arm is arranged to be moved in a circular path about the axis of the balance weight and balance pin and to impart a force against the inclined surface of the radially projecting plate. While this force is perpendicular to the axis of the balance pin and weight, it is inclined relative to the flat surface of the projecting plate. Rotation of the arm of the balance key will produce rotation of the balance weight due to the force applied against the inclined surface of the projecting plate, and this rotation will also produce translation of the balance weight along the balance pin. The balance weight may be translated, as it is rotated, with very high accuracy along the balance pin in either direction to achieve precise balancing of an instrument.

Accordingly, the principal object of the invention is to provide a threadless balancing device for balancing precision instruments.

Another important object is to provide a simple precision threadless adjustment for accurately positioning a movable object.

Still another object is to provide a precision balancing adjustment having almost infinite resolution.

Yet another object is to provide a simple balancing device which may be easily manufactured to high standards of accuracy.

Figures 2, 3:
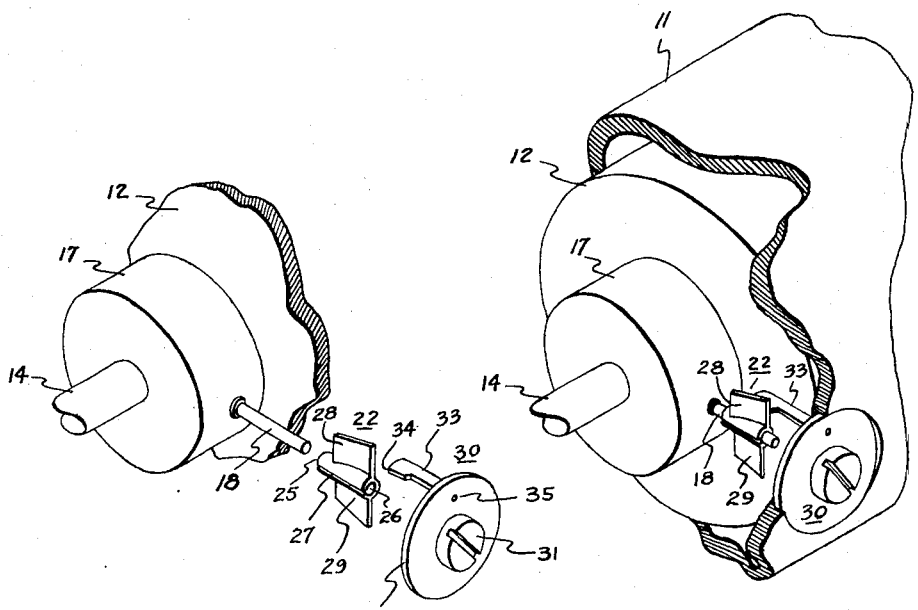

The above objects and general description of the invention will be more fully understood and further objects and advantages will become apparent from a study of the following detailed description in connection with the drawings, wherein, FIG. 1 is a perspective view of the floated gyroscope provided with the novel balancing device of this invention, FIG. 2 is an exploded and enlarged view of the elements of the balancing device, and FIG. 3 is an enlarged assembled view of the balancing device of the invention.

Referring to FIG. 1, there is shown a perspective cutaway view of a single-degree-of-freedom floated gyroscope employing a pair of balancing devices in accordance with the invention. The floated gyroscope comprises an outer cylindrical case or housing 11 containing an inner case 12 firmly supported by shafts 13 and 14 concentrically aligned within the outer case. The ends of shafts 13 and 14 are journaled in bearings located in each end of the outer case 11. The inner case 12 is provided with a limited angular movement about the longitudinal axis of the outer cylindrical case 11. This longitudinal axis is referred to as the output axis O of the gyroscope.

The inner case 12 contains a gyro stator 15 and a rotor 16 mounted for rotation about a spin axis S. The rotor-stator assembly forms a synchronous electric motor and conductor leads, not shown, connect to suitable terminals outside of the outer case 11.

Both the inner case 12 and the outer case 11 are hermetically sealed. The space between these two cases is filled with a high-density, high-viscosity fluid to provide damping and to relieve the load placed by the inner case 12 and gyro assembly upon the bearings located in each end of the outer case.

A torque generator and a signal generator, not shown, are also mounted upon shafts 13 and 14, as more fully illustrated in U.S. Patent 2,752,791. Coarse balancing means are provided as part of the inner case 12 to obtain an approximate balance of the inner case with gyro assembly about the output axis O.

One end of inner case 12 is provided with a hub 17 upon which the fine balancing devices of this invention are attached. As illustrated in FIG. 1, four mutually perpendicular pins 18–21 extend radially from the surface of hub 17. Two of these pins 18 and 19 are balance pins having a smooth cylindrical surface. The other two pins 20 and 21 serve as counter weights and are larger in diameter than pins 18 and 19. Balance weights 22 and 23 are carried by balance pins 18 and 19.

FIG. 2 illustrates an enlarged and exploded view of one of the balancing devices. The balance weight 22 comprises a hollow tubular member 25 with bore 26 and a longitudinal slot 27. A pair of diametrically disposed fins or plates 28 and 29 extend outwardly from the surface of the tubular member. Each of these plates has a smooth flat surface defining a plane which is inclined slightly relative to the axis of the bore 26. The inclination of plate 28 relative to the axis of the bore 26 is opposite to the inclination of plate 29 relative to the axis of the bore.

A balance key 30 comprises a slotted head 31 for receiving an adjusting tool to rotate the balance key about the axis of balance pin 18. The balance key further includes a circular flange 32 adapted to rotatably mount the balance key within the outer case 11 adjacent the end of balance pin 18 as shown in FIG. 3. Attached to the inside of the circular flange 32 is an arm 33 having a lateral projection forming tip 34. Tip 34 is adapted to contact the flat surface on the back side of plate 28 upon rotation of balance key 30 to impart a rotary force against the inclined surface of the plate. An indicial mark 35 affixed to the outside surface of flange 32 is aligned with the tip 34 to indicate to an operator the position of the tip as the balance key is rotated.

FIG. 3 illustrates the assembled view of balance weight 22 upon balance pin 18. Balance key 30 is rotatably mounted and hermetically sealed in outer case 11 adjacent the end of balance pin 18. Balance weight 22 is tightly pressed on balance pin 18. Upon rotation of balance key 30 in a counter-clockwise direction, the tip 34 on arm 33 engages the rear flat surface of inclined plate 28 of balance weight 22. The tip exerts a rotary force upon the inclined plate causing the balance weight to rotate counter-clockwise about balance pin 18. Due to the inclination of plate 28, the force applied by the tip of arm 33 is not perpendicular to the surface of plate 28. As a result, a small translational component of force is exerted upon the surface of plate 28 as the plate rotates. This translational force is parallel to the axis of balance pin 18 and causes balance weight 22 to be driven away from hub 17 as the balance weight rotates.

Rotation of balance key 30 in a clockwise direction will bring the rear side of arm 33 against the rear flat surface of inclined plate 29. The rear side of arm 33 is provided with a tip for exerting a rotary force upon the inclined plate 29 causing the balance weight to rotate clockwise about pin 18. Due to the opposite inclination of plate 29 with respect to plate 28, the translational force exerted against plate 29 as the balance weight rotates causes the balance weight to be driven toward hub 17.

The balance weights 22 and 23 are positioned along their respective balance pins upon rotation by their corresponding balance keys until a precise balance of inner case 12 about the output axis O is obtained. It is important that each balance key be rotated a quarter turn in the reverse direction after the balancing operation to insure that the tip of the arm is not in contact with the plates of the balance weight. A quarter turn in the reverse direction will allow a sufficient separation between the tip of the arm and the plates of the balance weight to prevent any interference during the normal operation of the gyroscope.

The positioning of the balance weights of this invention along their respective balance pins may be achieved with very high accuracy. The adjustment is equivalent to several hundred threads per inch when compared with the conventional threaded nut and screw balancing arrangement. The resolution of adjustment which may be achieved is very high, being dependent upon the angle of inclination between the inclined plates and the axis of the bore of the balance weights. A small angle of inclination produces a high resolution. It is important to note that the angle of inclination between the oppositely disposed plates and the axis of the bore do not have to be identical. By choosing different angles of inclination, one resolution of adjustment may be achieved upon clockwise rotation and a different resolution of adjustment may be achieved upon counter-clockwise rotation of the balance weight.

The degree of precision involved and the delicate nature of the adjustments may be more fully appreciated by considering the dimensions of an actual balance pin and weight for a miniature floated gyroscope. In one model the balance pin possessed a length of 0.25 inch and a diameter of 0.04 inch. The balance weight possessed a length of 0.157 inch and a maximum diameter of 0.15 inch. The angle of inclination between the balance plates and the axis of the bore was approximately six degrees.

Since many changes could be made in the construction of the above described balancing devices and many widely different embodiments of the invention could be made without departing from the scope thereof, it is intended that all matter contained in the above description or shown in the accompanying drawing shall be interpreted as illustrative and not in a limiting sense.

What is claimed is:

1. Apparatus for balancing an object about a known axis comprising in combination:
    (a) a smooth pin attached to said object and projecting radially from said known axis,
    (b) a balance weight having a cylindrically smooth bore tightly pressed upon said smooth pin,
    (c) an inclined plate attached to and extending outwardly from the surface of said balance weight, said inclined plate having a flat surface defining a plane which is inclined relative to the axis of the bore of said balance weight, and
    (d) means adapted to apply a force about the axis of said pin and balance weight and against the flat surface of said inclined plate, said force causing said balance weight to rotate about and to translate along said pin to balance said object about said known axis.

2. The apparatus defined by claim 1 further comprising:
    (a) a second smooth pin attached to said object and projecting radially from said known axis, said second smooth pin being angularly displaced relative to said smooth pin,
    (b) a second balance weight having a cylindrically smooth bore tightly pressed upon said second smooth pin,
    (c) an inclined plate attached to and extending outwardly from the surface of said second balance weight, said inclined plate having a flat surface defining a plane which is inclined relative to the axis of the bore of said second balance weight, and
    (d) means adapted to apply a force about the axis of said second pin and balance weight and against the surface of said inclined plate, said force causing said second balance weight to rotate about and to translate along said second pin to balance said object about said known axis.

3. In a gyroscope including an outer cylindrical case having a longitudinal axis and including an inner case containing a gyroscope rotor and stator assembly supported by shaft means concentric with said longitudinal axis, balancing apparatus for balancing said inner case containing said rotor and stator assembly about said longitudinal axis comprising in combination:
    (a) a first smooth pin attached to said inner case and projecting radially from said longitudinal axis,
    (b) a second smooth pin attached to said inner case and projecting radially from said longitudinal axis, said second smooth pin being angularly displaced from said first smooth pin,
    (c) first and second balance weights having smooth cylindrical bores pressed upon said first and second smooth pins, respectively,
    (d) each of said first and second balance weights including an inclined plate attached to and extending outwardly from the surface of each balance weight, each of said plates having a flat surface inclined relative to the axis of the cylindrical bores of the respective balance weights by an angle substantially less than ninety degrees, and
    (e) means associated with each of said first and second balance weights for applying a force about the axis of each of said balance weights and against the flat surfaces of each of said inclined plates to produce rotation and translation of each balance weight relative to its smooth pin.

4. The balancing apparatus as defined by claim 3 wherein each of said first and second balance weights includes a single longitudinal slot extending through the surface of each balance weight to the cylindrical bore and substantially parallel with the axis of the bore.

5. The balancing apparatus as defined by claim 3 wherein said means associated with each of said first and second balance weights for applying a force against the flat surfaces of each of said inclined plates includes a rotatable balance key mounted in the outer cylindrical case of said gyroscope adjacent the end of each of said first and second smooth pins, each rotatable balance key having an arm projecting along and displaced from each smooth pin, said arm having a tip adapted to engage the flat surface of each of said inclined plates for applying said force.

6. Apparatus for balancing a movable object about a fixed axis comprising in combination:
 (a) a smooth cylindrical balance pin attached to said movable object and projecting outwardly from said fixed axis,
 (b) a balance weight having a smooth cylindrical bore pressed upon said balance pin, said balance weight having an outwardly projecting flat surface extending along the balance weight, said flat surface defining a plane inclined relative to the axis of the smooth bore by an angle substantially less than ninety degrees, and
 (c) a rotatable balance key adjacent the end of said balance pin, said balance key having an arm projecting along the side of and separated from said balance pin and being rotatable about said balance pin, said arm being adapted to apply a force against the inclined flat surface of said balance weight to rotate and to translate said balance weight.

7. The apparatus defined by claim 6 wherein the angle of inclination between the plane of said flat surface and the axis of the smooth bore is greater than five degrees and less than fifteen degrees.

8. The apparatus defined by claim 6 wherein the end of the arm of said rotatable balance key is provided with a laterally projecting tip for engaging the inclined flat surface of said balance weight.

9. Apparatus for balancing an object about a pivot point comprising in combination:
 (a) a smooth balance pin attached to said object,
 (b) a balance weight having a smooth cylindrical bore pressed upon said balance pin, the position of said balance weight along said balance pin determining the balance of said object about said pivot point,
 (c) a member having a flat surface attached to and extending outwardly from said balance weight, said flat surface lying in a plane inclined with respect to the axis of the smooth cylindrical bore of said balance weight, and
 (d) means adapted to apply a rotational force against the flat surface of said member to rotate said member and said balance weight about said balance pin to cause said balance weight to be positioned along said balance pin to balance said object.

10. Apparatus for accurately positioning an object having a smooth cylindrical bore along a smooth stationary shaft upon which said object has been mounted comprising in combination:
 (a) an inclined plate attached to and outwardly extending from the surface of said object, said plate having a flat surface defining a plane which is inclined relative to the axis of said stationary shaft, and
 (b) means associated with said object and rotatable about said stationary shaft for applying a rotational force against the inclined flat surface of said plate to rotate said object about said stationary shaft, said rotational force causing said object to rotate about and to translate along said stationary shaft.

11. Positioning apparatus comprising in combination:
 (a) stationary shaft having a smooth surface,
 (b) an object having a smooth cylindrical bore fitted upon said shaft, said object having a flat surface lying in a plane inclined with respect to the axis of the bore of said object,
 (c) an arm having a tip adapted to touch the flat surface of said object, and
 (d) means associated with said arm for imparting rotary motion to the tip of said arm about said stationary shaft and against the flat surface of said object for causing said object to rotate about and to translate along said stationary shaft.

12. Positioning apparatus comprising in combination:
 (a) a shaft having a smooth surface,
 (b) an object having a smooth cylindrical bore fitted upon said shaft, said object having a flat surface lying in a plane inclined with respect to the axis of the bore of said object,
 (c) an arm having a tip adapted to touch the flat surface of said object, said arm and said shaft being independently mounted for relative rotation of the tip of said arm about said shaft, and
 (d) means for imparting relative rotation between said arm and said shaft in a direction to maintain the tip of said arm in engagement with the flat surface of said object, said relative rotation causing said object to rotate about and to translate along said shaft.

References Cited by the Examiner
UNITED STATES PATENTS

| | | | |
|---|---|---|---|
| 723,976 | 3/1903 | Ball | 74—499 X |
| 879,414 | 2/1908 | Ross | 74—499 X |
| 2,665,904 | 1/1954 | Lehmann | 74—504 X |
| 2,752,791 | 7/1956 | Jarosh et al. | 74—5.6 |
| 2,862,229 | 12/1956 | Bacca | 75—531 X |
| 3,010,326 | 11/1961 | Koning | 74—5.4 |
| 3,127,786 | 4/1964 | Wooley | 74—504 X |

BROUGHTON G. DURHAM, *Primary Examiner.*

T. W. SHEAR, *Assistant Examiner.*